(12) United States Patent
Botez

(10) Patent No.: US 9,709,130 B2
(45) Date of Patent: Jul. 18, 2017

(54) INVERTED TOOTH CHAIN HAVING INNER FLANK ENGAGEMENT

(71) Applicants: Schaeffler Technologies AG & Co. KG, Herzogenaurach (DE); Schaeffler Group USA, Inc., Fort Mill, SC (US)

(72) Inventor: Lucian Botez, Novi, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 156 days.

(21) Appl. No.: 14/690,762

(22) Filed: Apr. 20, 2015

(65) Prior Publication Data

US 2015/0308541 A1  Oct. 29, 2015

Related U.S. Application Data

(60) Provisional application No. 61/985,225, filed on Apr. 28, 2014.

(51) Int. Cl.
| | |
|---|---|
| *F16G 13/04* | (2006.01) |
| *F16H 55/08* | (2006.01) |
| *F16H 55/30* | (2006.01) |
| *F16H 7/06* | (2006.01) |
| *F16G 13/08* | (2006.01) |

(52) U.S. Cl.
CPC ............... *F16G 13/04* (2013.01); *F16H 7/06* (2013.01)

(58) Field of Classification Search
CPC ............. F16G 13/04; F16G 13/08; F16H 7/06
See application file for complete search history.

(56) References Cited

U.S. PATENT DOCUMENTS

| | | | |
|---|---|---|---|
| 6,244,983 B1 | 6/2001 | Matsuda | |
| 6,325,735 B1 * | 12/2001 | Kanehira | F16G 13/04 474/206 |
| 2001/0007842 A1 | 7/2001 | Suzuki et al. | |
| 2001/0023212 A1 | 9/2001 | Horie et al. | |
| 2002/0028720 A1 | 3/2002 | Horie et al. | |
| 2002/0045504 A1 * | 4/2002 | Suzuki | F16G 13/04 474/212 |
| 2003/0027675 A1 | 2/2003 | Suzuki et al. | |
| 2004/0110591 A1 | 6/2004 | Kotera | |
| 2010/0069188 A1 | 3/2010 | Adachi et al. | |
| 2011/0009221 A1 * | 1/2011 | Ogo | F01L 1/02 474/213 |
| 2014/0200106 A1 * | 7/2014 | Young | F16G 13/04 474/148 |

* cited by examiner

*Primary Examiner* — William E Dondero
*Assistant Examiner* — Robert T Reese
(74) *Attorney, Agent, or Firm* — Volpe and Koenig, P.C.

(57) ABSTRACT

A chain and sprocket drive system that includes a sprocket and an inverted tooth chain assembly configured to mesh with the sprocket is provided. The chain assembly includes at least two rows of links, each of the links having teeth with a pair of inner flanks, a pair of outer flanks, tips interconnecting a respective inner flank and outer flank, and a radiused crotch located between the pair of inner flanks. The inner flanks have an enlarged profile in a direction toward a center of the link in comparison to a profile of the outer flanks. A contact position with a tooth of the sprocket engaged therewith is located on the link in an area extending from the inner flank into the radiused crotch and on the sprocket in an area of the radiused tip of the tooth.

14 Claims, 5 Drawing Sheets

INVERTED TOOTH CHAIN HAVING INNER FLANK ENGAGEMENT

INCORPORATION BY REFERENCE

The following documents are incorporated herein by reference as if fully set forth: U.S. Provisional Patent Application No. 61/985,225, filed Apr. 28, 2014.

FIELD OF INVENTION

This application is generally related to an inverted tooth chain assembly and is more particularly related to an improved link profile for inner links on an inverted tooth chain assembly.

BACKGROUND

Inverted tooth chain assemblies are used in connection with sprockets for drive assemblies in automotive and various other applications. In the prior known inverted tooth chain assemblies, the chain is formed from a number of links, each including a pair of outer flanks that are configured to engage in driving connection with teeth on a sprocket, and a pair of inner flanks. During operation, the outer flanks engage with the sprocket teeth, and the contact of the teeth engaging the outer flanks creates noise. In these known sprocket and chain drive systems, contact between links and sprocket teeth typically occurs at a medial portion on both the sprocket tooth and the outer flank of the links. While some efforts are known to reduce noise by having contact between the sprocket teeth and the inner flanks of the link teeth, these arrangements have high stress concentrations at the contact points. It would be desirable to reduce the noise caused by meshing of the sprocket and chain assemblies, and provide a greater contact portion on links to improve stress distribution.

SUMMARY

An inverted tooth chain assembly that includes links having an enlarged profile on an inner flank compared to a profile of an outer flank is provided. The chain and sprocket drive system includes a sprocket including a plurality of teeth, each of the plurality of teeth having an engaging flank, a disengaging flank, and a radiused tip interconnecting the engaging flank and the disengaging flank. A root is located between adjacent teeth of the plurality of teeth. An inverted tooth chain assembly configured to mesh with the sprocket is provided that includes at least two rows of links. Each of the links has two teeth with a pair of inner flanks, a pair of outer flanks, tips interconnecting respective inner and outer flanks, and a radiused crotch located between the pair of inner flanks. The inner flanks have an enlarged profile in a direction toward a center of the link in comparison to a profile of the outer flanks, and a contact position with a respective one of the teeth of the sprocket engaged therewith is located on the link in an area extending from the inner flank into the radiused crotch and on the sprocket in an area of the radiused tip of the tooth, with the radiused tip of the tooth engaged in the radiused crotch in a fully meshed position. The enlarged profile of the inner flank significantly reduces contact stresses due to the greater contact area, as well as reduces chordal action that causes vibration as the sprocket and chain initially engage and disengage.

An inverted tooth chain assembly configured to mesh with a sprocket assembly is also provided. The inverted tooth chain assembly includes at least two rows of links, and each of the links have two teeth with a pair of inner flanks, a pair of outer flanks, and tips interconnecting respective ones of the inner and outer flanks. A radiused crotch is located between the pair of inner flanks. The inner flanks have an enlarged profile in a direction toward a center of the link in comparison to a profile of outer flanks on adjacent links, and a contact position with a tooth of a sprocket adapted to be engaged therewith is located on the link in an area extending from the inner flank into the radiused crotch.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the Drawings.

DETAILED DESCRIPTION OF THE PREFERRED EMBODIMENTS

Figure 1:
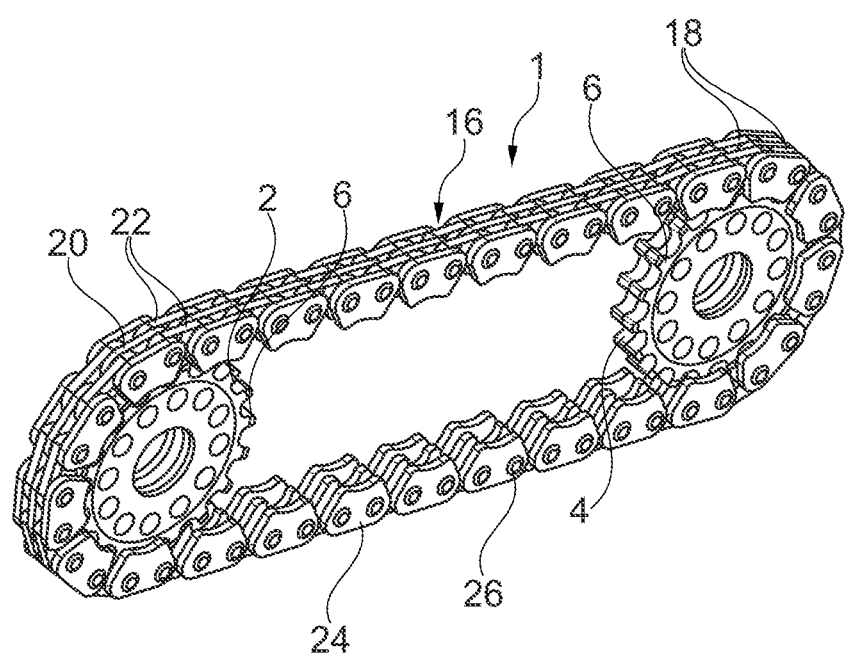
FIG. 1 is a perspective view of a chain and sprocket drive system according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivates thereof, and words of similar import.

Figure 2:
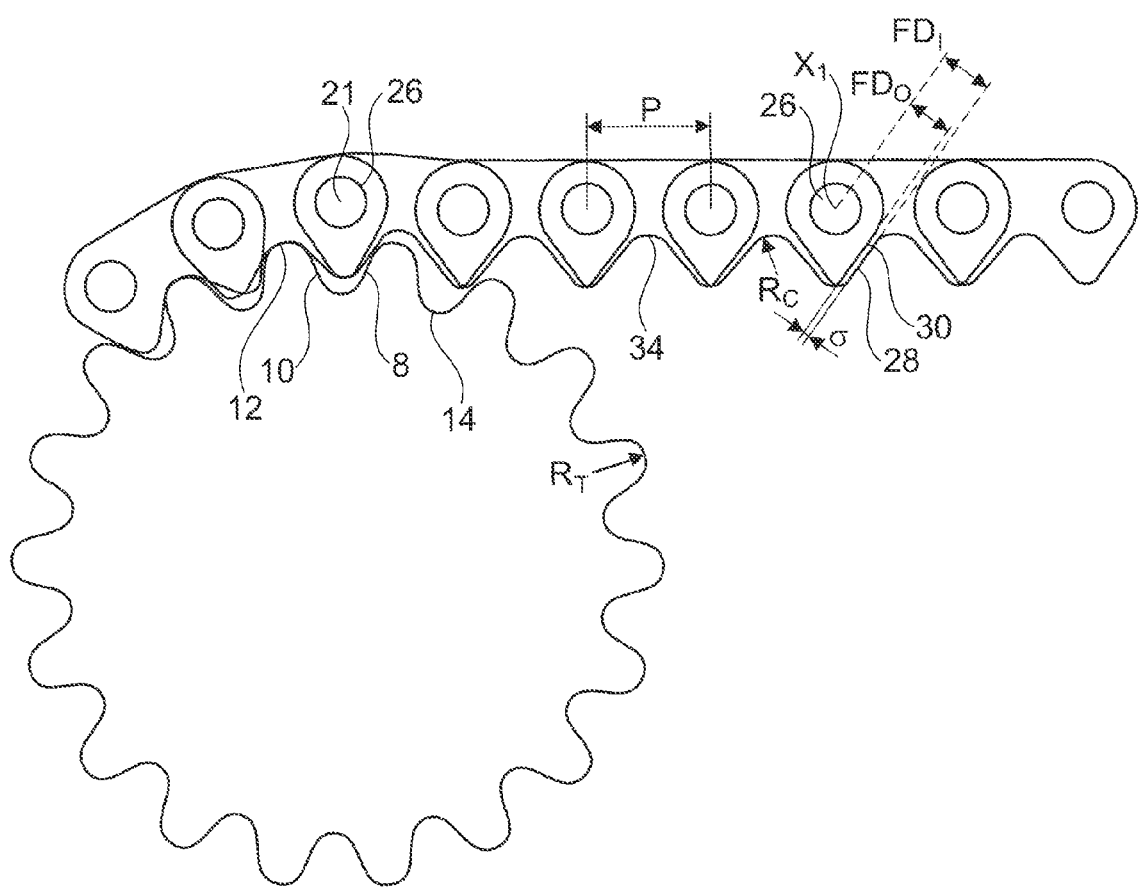
FIG. 2 is a front view of the chain and sprocket drive system of FIG. 1 as partially assembled.

FIGS. 1 and 2 show a chain and sprocket drive system 1. The chain and sprocket drive system 1 includes a sprocket 2 having a plurality of teeth 6, each of the plurality of teeth 6 having an engaging flank 8, a disengaging flank 10, and a radiused tip 12 interconnecting the engaging flank 8 and the disengaging flank 10, as shown in FIG. 2. A root 14 is located between adjacent teeth of the plurality of teeth 6. In one embodiment, the sprocket 2 is a laminated sprocket and includes a plurality of plates 4, see FIG. 1, each including a plurality of teeth 6 and the teeth 6 of adjacent plates 4 are aligned with one another. The plurality of teeth 6 on the sprocket 2 preferably have a uniform profile. However, the profiles of the sprocket teeth 6 can be varied.

Figure 3:
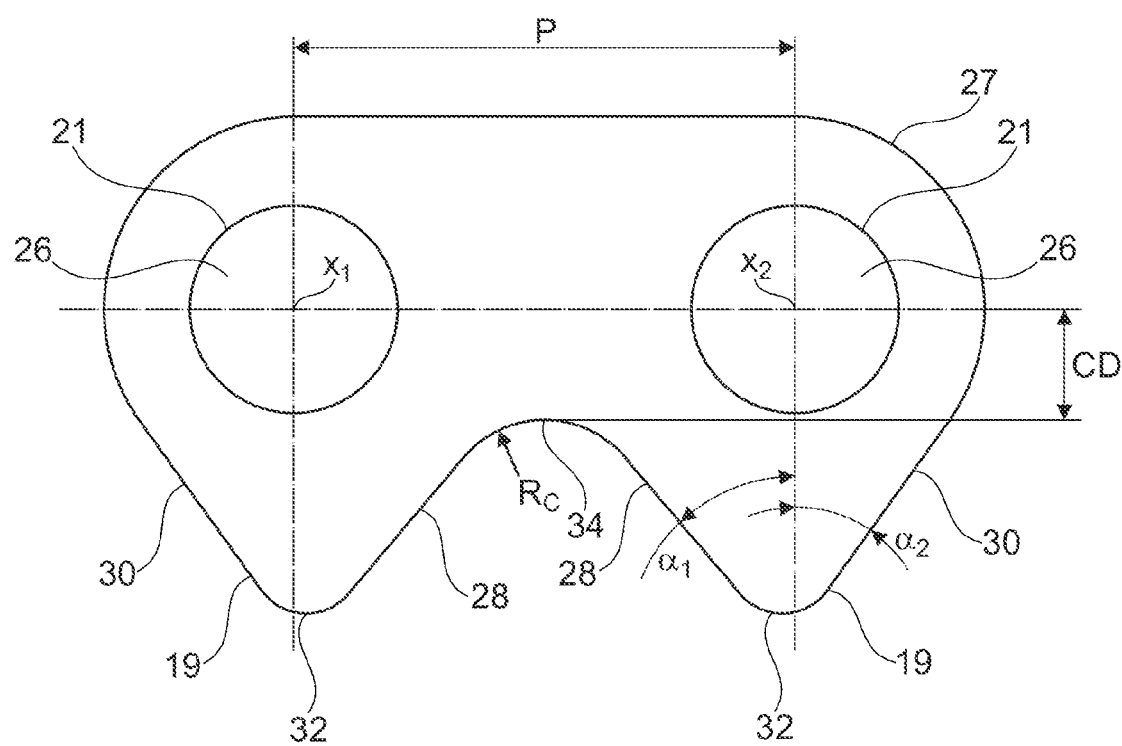
FIG. 3 is a front plan view of a link of the chain and sprocket drive system of FIGS. 1 and 2.
Figure 4:
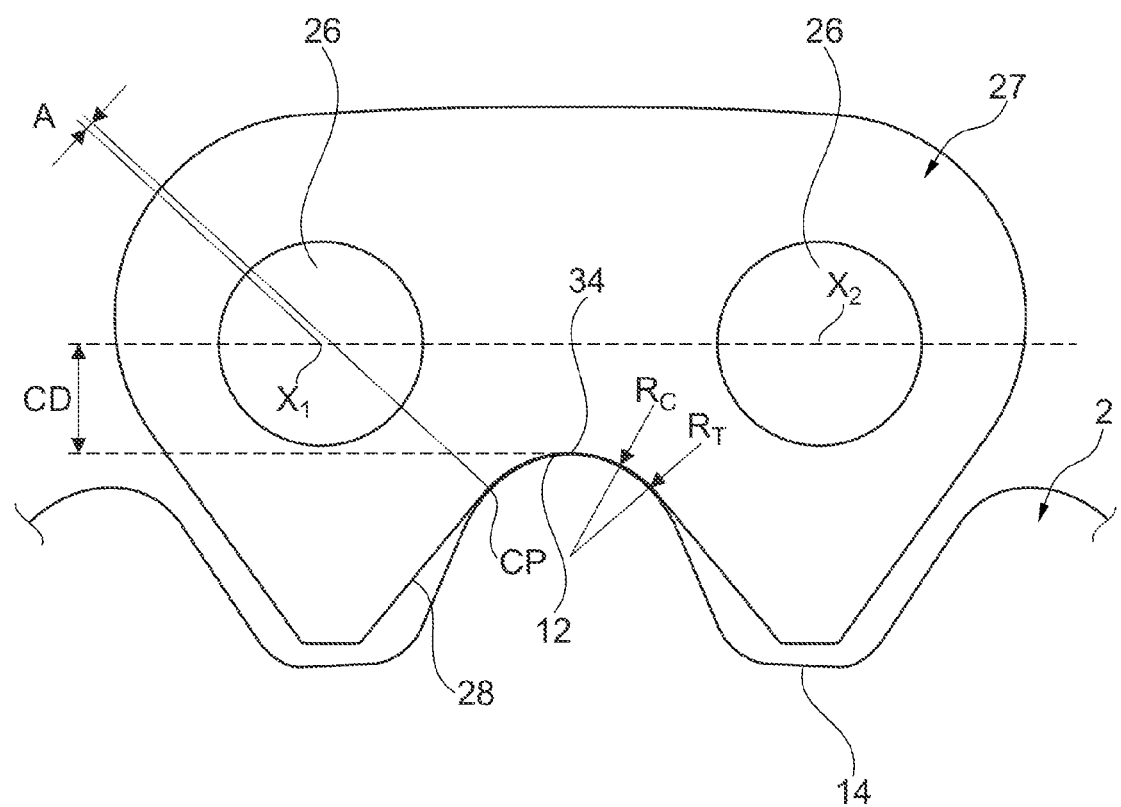
FIG. 4 is a front plan view of a link of the chain and sprocket drive system of FIGS. 1 and 2 engaged with a sprocket.
Figure 5:
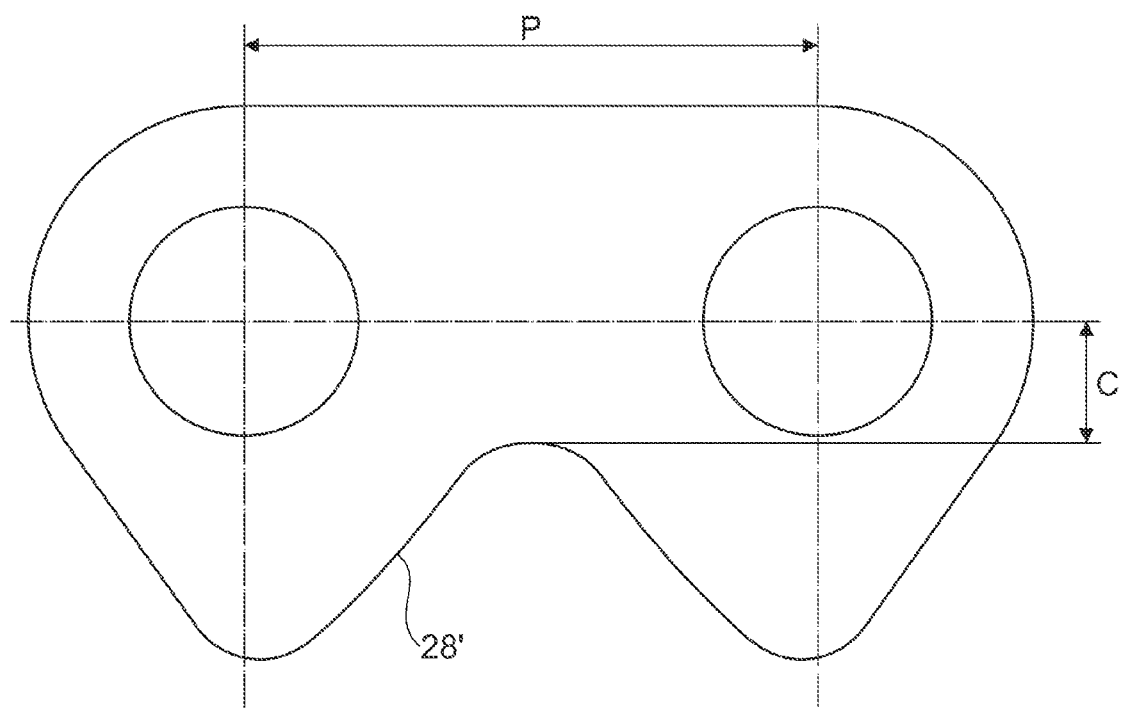
FIG. 5 is a front plan view of a link of the chain and sprocket drive system with concave inner flanks.

An inverted tooth chain assembly 16 configured to mesh with the sprocket 2 is provided that includes at least two rows of links 18. The inverted tooth chain assembly 16 includes chain pins 26 that extend through openings 21 in the links 18 that allow the links 18 to articulate relative to links 18 in adjacent row(s). Each of the links 18 have two teeth 19 with a pair of inner flanks 28, a pair of outer flanks 30, and tips 32 interconnecting a respective inner flank 28 and outer flank 30. A radiused crotch 34 of the link 27 having a radius $R_C$ is located between the pair of inner flanks 28. As shown in FIG. 3, the inner flanks 28 of the link 27 have an enlarged profile in a direction toward a center of the link 27 in comparison to a profile of the outer flanks 30. In one preferred arrangement, the enlarged profile of the inner flanks 28 is formed as a straight line. In another preferred arrangement, shown in FIG. 5, the enlarged profiled of the inner flanks 28' is concave. As shown in FIG. 4, a contact position with a tooth 6 of the sprocket 2 engaged therewith is located on the link 27 in an area extending from the inner flank 28 into the radiused crotch 34 and on the sprocket 2 in an area from the engaging flank 8 to the radiused tip 12 of the tooth 6, with the radiused tip 12 of the tooth 6 engaged in the radiused crotch 34 in a fully meshed position. A radius $R_T$ of the radiused tips 12 of the sprocket teeth 6 is preferably at least 90-100% of the radius $R_C$ of the radiused crotch 34 of the link 27, and more preferably at least 95% of the radius $R_C$ of the radiused crotch 34 of the link 27. This configuration increases the contact surface which reduces the contact stress between the links 27 and the sprocket 2 for a fully meshed link.

The inner flanks 28 exclusively drivingly engage with the teeth 6 of the sprocket 2, and the outer flanks 30 do not drivingly engage with the teeth 6 of the sprocket 2. In one preferred arrangement shown in FIG. 1, the inverted tooth chain assembly 16 includes an inner link 20 and two outer links 22, and the links 20, 22 include the inner flanks 28 having the enlarged profile. One of ordinary skill in the art would recognize that any number of rows of links can be provided for a given application. The inverted tooth chain assembly 16 preferably also includes guide plates 24 on axial ends of the inverted tooth chain assembly 16.

As shown in FIG. 3, a chain pitch P is defined as a distance between a center axis $X_1$, $X_2$ of adjacent chain pins 26. As shown in FIGS. 2 and 3, the profile of the inner flanks 28 is preferably enlarged by at least 6-15% of the chain pitch P compared to the profile of the outer flanks 30, and is more preferably enlarged by at least 6.5% of the chain pitch P compared to the profile of the outer flanks 30. As shown in FIG. 2, a distance 6 is preferably defined between a tangent line defined along the enlarged inner flank 28 surface and a tangent line defined along the outer flank surface 30 of an adjacent link. As shown in FIG. 2, an inner flank depth $FD_I$ is defined between a tangent line defined along an inner flank 28 surface and a center axis of a chain pin 26, and an outer flank depth $FD_O$ is defined between a tangent line defined along an outer flank 30 surface and the center axis of the chain pin 26, and the inner flank depth $FD_I$ is greater than the outer flank depth $FD_O$.

As shown in FIG. 4, a distance (A) between a center axis $X_1$ of the chain pin 26 and a contact point CP on the crotch 34 with the sprocket tooth 6 is preferably less than 8% of the chain pitch P, and more preferably less than 5% of the chain pitch P. As shown in FIG. 3, an inner flank angle a1 is defined between a tangent line defined along an inner flank 28 surface and a centerline extending through the chain pin opening 21, and an outer flank angle $\alpha_2$ is defined between a tangent line defined along an outer flank surface and the centerline extending through the chain pin opening 21. The inner flank angle $\alpha_1$ is greater than the outer flank angle $\alpha_2$.

As shown in FIGS. 3 and 4, a crotch depth CD of the link 27 having the enlarged inner flanks 28 is defined as a distance between a line extending between adjacent centers $X_1$, $X_2$ of the chain pins 26 and the radiused crotch 34 of the link 27. The crotch depth CD is preferably at least 18-25% of the chain pitch P, and more preferably at least 18.75% of the chain pitch P.

Having thus described various embodiments of the present chain and sprocket drive system in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LIST OF REFERENCE NUMBERS

1 Chain and Sprocket Drive System
2 Sprocket
4 Plates of Sprocket
6 Teeth
8 Engaging Flank
10 Disengaging Flank
12 Radiused Tip of Tooth
14 Root of Tooth
16 Inverted Tooth Chain Assembly
18 Links
19 Link Tooth
20 Inner Link
21 Chain Pin Opening
22 Outer Link
24 Guide Plates
26 Chain Pin
27 Link with Enlarged Inner Portion
28, 28' Inner Flanks
30 Outer Flanks
32 Tips of Links
34 Radiused Crotch of Links
$X_1$, $X_2$—Center Axis for Pin
P—Chain Pitch
CD—Crotch Depth of Link with Enlarged Inner Flank
$\alpha_1$—Angle Between Pin Centerline and Inner Flank Contact Surface
$\alpha_2$—Angle Between Pin Centerline and Outer Flank Contact Surface
$R_C$—Radius of Link Crotch
$R_T$—Radius of Tooth Tip
δ—Distance Between Tangent Line Defined Along Enlarged Inner Flank Surface and Tangent Line Defined Along Outer Flank Surface of Adjacent Link
$FD_I$—Flank Depth of Inner Flank
$FD_O$—Flank Depth of Outer Flank
A—Distance Between Center Axis ($X_1$) of Chain Pin and Contact Point (CP) on Inner Flank with Sprocket Tooth

What is claimed is:

1. A chain and sprocket drive system comprising:
a sprocket including a plurality of teeth, each of the plurality of teeth having an engaging flank, a disengaging flank, a radiused tip interconnecting the engaging flank and the disengaging flank, and a root located between adjacent teeth of the plurality of teeth; and
an inverted tooth chain assembly configured to mesh with the sprocket, the inverted tooth chain assembly including at least two rows of links,
each of the links having two teeth with a pair of inner flanks, a pair of outer flanks, tips interconnecting respective inner and outer flanks, and a radiused crotch located between the pair of inner flanks, and
the inner flanks have an enlarged profile in a direction toward a center of the link in comparison to a profile of the outer flanks, and a contact position with a tooth of the sprocket engaged therewith is located on the link in an area extending from the inner flank into the radiused crotch and on the sprocket in an area of the radiused tip of the tooth, with the radiused tip of the tooth engaged in and contacting the radiused crotch in a fully meshed position.

2. The chain and sprocket drive system of claim 1, wherein a radius of the radiused tips of the sprocket teeth is at least 90-100% of a radius of the radiused crotches of the links.

3. The chain and sprocket drive system of claim 1, wherein an inner flank depth is defined by a first shortest distance defined between a tangent line defined along an inner flank surface and a center axis of a chain pin, and an outer flank depth is defined by a second shortest distance defined between a tangent line defined along an outer flank surface and the center axis of the chain pin, and the inner flank depth is greater than the outer flank depth.

4. The chain and sprocket drive system of claim 1, wherein an inner flank angle is defined between a tangent line defined along an inner flank surface and a centerline extending through a chain pin opening, and an outer flank angle is defined between a tangent line defined along an outer flank surface and the centerline extending through the chain pin opening.

5. The chain and sprocket drive system of claim 1, wherein the enlarged profile of the inner flanks is formed as a straight line.

6. The chain and sprocket drive system of claim 1, wherein the enlarged profiled of the inner flanks is concave.

7. The chain and sprocket drive system of claim 1, wherein the enlarged profile of the inner flanks defines a first area that is enlarged by at least 6-15% of a chain pitch compared to a second area defined by the profile of the outer flanks.

8. The chain and sprocket drive system of claim 1, wherein the plurality of teeth on the sprocket have a uniform profile.

9. The chain and sprocket drive system of claim 1, wherein the inverted tooth chain assembly includes guide plates on axial ends of the inverted tooth chain assembly.

10. The chain and sprocket drive system of claim 1, wherein the inverted tooth chain assembly includes chain pins that extend through chain pin openings in the links and allow the links to articulate relative to links in adjacent rows.

11. The chain and sprocket drive system of claim 10, wherein a distance between a center axis of the chain pin and a contact point on the radiused crotch defined normal to the inner flank is less than 8% of a chain pitch P.

12. The chain and sprocket drive system of claim 10, wherein a distance between a line extending between adjacent centers of chain pins and a center point of the crotch of the link is at least 18-25% of a chain pitch.

13. The chain and sprocket drive system of claim 1, wherein the radiused tip of the tooth contacts a center point of the radiused crotch in a fully meshed position.

14. An inverted tooth chain assembly configured to mesh with a sprocket assembly, the inverted tooth chain assembly comprising:
at least two rows of links,
each of the links having two teeth with a pair of inner flanks, a pair of outer flanks, tips interconnecting respective inner and outer flanks, and a radiused crotch located between the pair of inner flanks, and
the inner flanks have an enlarged profile in a direction toward a center of the link in comparison to a profile of the outer flanks, and a contact position with a tooth of a sprocket adapted to be engaged therewith is located on the link in an area extending from the inner flank into the radiused crotch, and a radiused tip of the tooth of the sprocket is adapted to engage in and contact the radiused crotch of the links in a fully meshed position.

* * * * *